United States Patent
Haag et al.

[11] 3,745,854
[45] July 17, 1973

[54] CAST REINFORCED HOUSING AND METHOD OF MAKING THE SAME

[75] Inventors: Robert Haag, Stuttgart-Bad Cannstatt; Albert Haupt, Oberriexingen; Siegfried Mayer, Kleinglattbach, all of Germany

[73] Assignee: Robert Bosch GmbH, Stuttgart, Germany

[22] Filed: Aug. 25, 1970

[21] Appl. No.: 66,741

[30] Foreign Application Priority Data
Sept. 27, 1969 Germany............... P 19 49 033.6

[52] U.S. Cl..................... 74/606 R, 164/98
[51] Int. Cl............................. F16h 57/02
[58] Field of Search........ 74/606 R; 164/111, 164/98

[56] References Cited
UNITED STATES PATENTS
1,998,709  4/1935  Dake.................. 164/111
3,263,521  8/1966  Müller................. 74/606 R

OTHER PUBLICATIONS

Marks, Lionel S. "Mechanical Engineers Handbook," 4th Ed. N.Y., McGraw-Hill Book Co. Inc., 1941, p. 420–421.

Primary Examiner—Charles J. Myhre
Assistant Examiner—F. D. Shoemaker
Attorney—Michael S. Striker

[57] ABSTRACT

A cast reinforced housing comprises a cast peripheral housing wall defining an interior chamber for the components of an apparatus and preferably consisting of cast aluminum. At least one reinforcing embedment is provided in the wall and consists of a material having greater strength than the material of the wall, for example steel.

11 Claims, 3 Drawing Figures 3,745,854

CAST REINFORCED HOUSING AND METHOD OF MAKING THE SAME

BACKGROUND OF THE INVENTION

The present invention relates generally to housings, and more particularly to cast housings. Still more particularly the invention relates to a cast housing for a gear-driven apparatus such as gear pumps or gear motors.

Housings for such gear-driven apparatus are of course already known, just as it is known to make such housings of cast aluminum. They are cast in suitably configurated molds and a known housing of this type has an inner space for accommodating the constituent components of the apparatus, which space is formed by two cylindrical bores partially overlapping one another. This known housing can be manufactured very economically and has therefore found wide acceptance. It does, however, have the disadvantage that it its walls are made with a thickness within acceptable limits—and of course thus within acceptable external dimensions for the housing overall—the strength of the walls is relatively low so that the housing can be used only under relatively insubstantial pump pressures if the housing is used in connection with a gear pump.

Evidently it would be desirable to be able to use such a housing—which is economically advantageous from the point of view of manufacture and selling—for applications where it must withstand greater stresses.

SUMMARY OF THE INVENTION

It is, accordingly, an object of the invention to provide an improved housing of the type under discussion.

More particularly it is an object of the present invention to provide such a housing which has substantially improved strength characteristics especially resistance to tensile stress on a continuous basis, over what is known from the art, given identical or substantially identical wall thickness.

In pursuance of the above objects, and others which will become apparent hereafter, one feature of the invention recites in a housing, particularly for gear-driven apparatus, which comprises briefly stated a cast peripheral housing wall defining an interior chamber for the components of said apparatus and consisting of a first material permitting manufacture of said wall as a casting. At least one reinforcing embedment is provided in the wall and consists of a second material having greater strength characteristics than the first material.

By producing a housing according to the invention, the stresses, particularly the tensile stresses acting upon the peripheral housing wall as a result of internal pressure developing in the housing space or chamber, are to at least a substantial extent transmitted into and withstood by the reinforcing embedment, thus relieving the lower-strength peripheral housing wall and making the thus produced housing capable of withstanding substantially greater stresses than a similar housing without the reinforcing embedment.

It has been found particularly advantageous to utilize steel as the material for the reinforcing embedment if the peripheral housing wall itself is of cast aluminum and cast for instance in a suitably configurated mold.

It is further advantageous if the material selected for the reinforcing embedment—whether it be steel or another suitable material—have a coefficient of thermal expansion and contraction which at least approximates that of the material for the peripheral housing wall itself.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
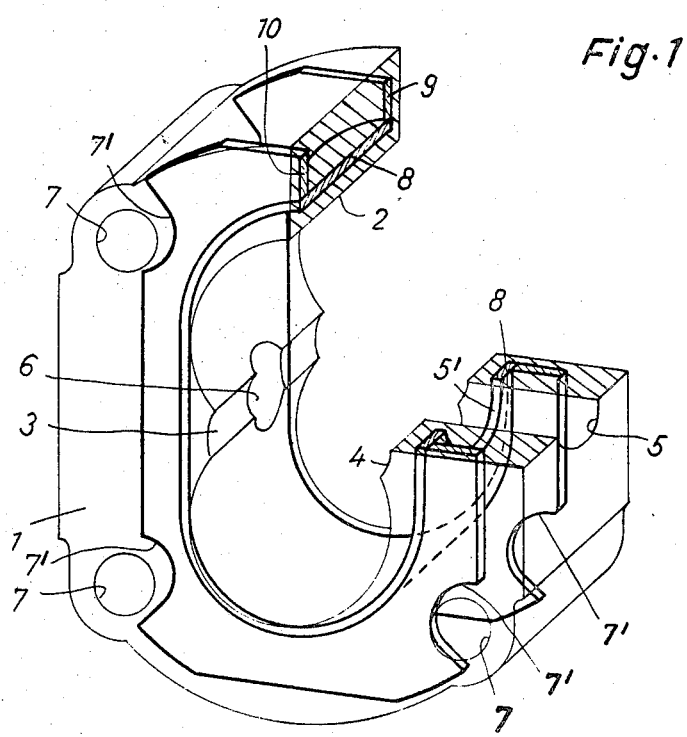
FIG. 1 is a partly sectioned perspective view illustrating a housing according to the present invention.

Discussing now the drawing in detail, and firstly the embodiment illustrated in FIG. 1 thereof, it will be seen that reference numeral 1 generally identifies the novel housing in toto. For purposes of explanation the housing in FIG. 1 shall be assumed as intended to house a gear pump. It is cast of an aluminum alloy in a suitably configurated mold in a known manner.

The housing 1 has an external contour composed of several cylindrical surfaces and is provided with an internal or interior chamber 2 which is open at opposite ends and defined in essence by two substantially cylindrical bores which extend in axial parallelism with one another and which partially overlap. In the region of the overlap there are provided two concavely configurated interior surface portions 3 and 4. An inlet opening 5 is provided normal to the plane intersecting the axis of the two parallel bores or cylinders whose imaginary outlines together define the interior chamber 2; this inlet is provided in one side wall of the housing 1 whereas the pump outlet 6 is provided in the opposite side wall of the housing 1. Pairs of apertures or bores 7 are provided in each side wall which permit the passage of bolts or other suitable fastening means for securing to the housing the non-illustrated covers which close off the opposite ends of the chamber 2.

According to the present invention the circumference or peripheral wall of the housing 11-consisting of cast aluminum—is provided with reinforcing embedments 8, 9 and 10 which here are assumed to be of steel and which together constitute in effect a supporting structure. The embedment 8 is in form of a sheet-steel tube 8 of substantially oval cross-section which is so large that in the illustrated embodiment the distance between the inner surface of the tube 8 and the inner surface of the wall of the housing 1 bounding the chamber 2 is approximately 2 mm; meaning that approximately a thickness of 2 mm of cast aluminum exists between the inner surface bounding the chamber 2 and the tube 8. The tube 8 is provided with circular cutouts 5' and 6' which respectively register with the inlet 5 and the outlet 6 in the housing wall; their diameter is approximately 4 mm larger than the diameter of the inlets 5 and 6, respectively.

At each of its opposite ends the tube 8 is provided with a flange of sheet metal, respectively identified with reference numerals 9 and 10 and provided with cutouts 7' which register with the apertures 7. These cutouts 7' surround the associated apertures 7 with approximately 1-2 mm spacing.

It will be appreciated that in FIG. 1 the outlines of the reinforcing embedments 8, 9 and 10 have been shown in solid heavy lines for purposes of better understanding only; naturally these outlines would not normally be visible inasmuch as the embedments 8, 9 and 10 are completely embedded within the cast aluminum material of the housing wall 1 and would not be visible at all. However, it is thought that understanding will be facilitated by the illustration which has been chosen.

Figure 2:
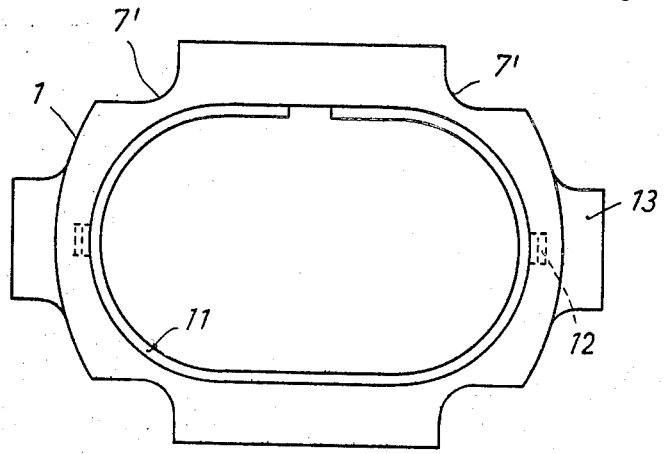
FIG. 2 is an end-elevational rather diagrammatic view illustrating a further embodiment of the invention.
Figure 3:
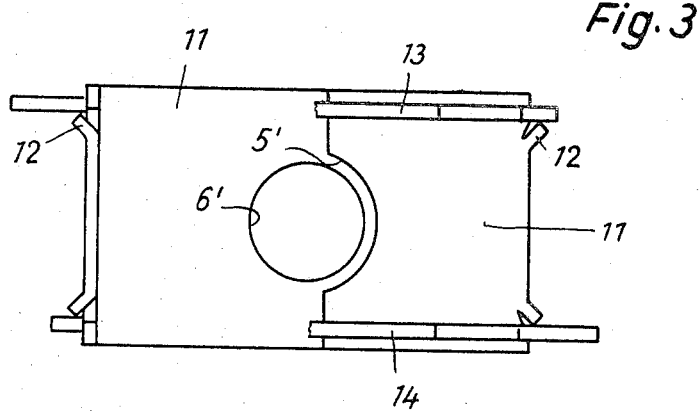
FIG. 3 is a top-plan view of FIG. 2.

Coming to the embodiment illustrated in FIGS. 2 and 3 it will be seen that here a planar strip of sheet metal is provided with cutouts 5' and 6' for registration with the pump inlet and pump outlet, respectively; this cutout has been formed to the shape of a tube having a substantially oval cross-section and identified with reference numeral 11. Near the edge or end of the tube and positioned on the long axis of the oval are provided short sheet metal portions which are stamped or otherwise displaced out of the sheet material of the tube 11 and so bent upwardly that abutments 12 are obtained. These are most clearly illustrated in FIG. 3 and it will also be seen that at each longitudinal edge of the tube 11 a flange 13 and 14, respectively, press against these abutments 12. The flanges in turn are provided with cutouts 7' which register with the apertures 7 (shown in FIG. 1).

The various cutouts are provided on the material of the tube 11 before the latter is cast or embedded in the peripheral housing wall. This makes it possible for the tools subsequently used for finishing the housing to find a homogenous material composition, that is tools such as drills, gear cutters or the like.

In this embodiment, as in the one shown in FIG. 1, the diameter of the cutouts in the embedments is made larger than the diameter of the apertures provided in the housing with which they must register, because this assures that even after mechanical working of the housing itself, for instance after cutting gears into the material in the inlet and outlet or the like, a certain amount of the basic material of the housing wall—i.e., cast aluminum in the illustrated embodiments—will remain inwardly of the material of the tube 8 or 11. This assumes, of course, that the embedments are positioned in the casting mold with an offset which is in normal tolerance variations.

It will be appreciated that the housing may be substantially cup-shaped, that is that the chamber may be open at one end rather than at both ends, and that other configurations are also possible. It will further be appreciated that any or all of the embedments may be perforated or apertured so that the material of the housing wall, such as cast aluminum, can flow into these apertures and establish a stronger and still more intimate bond between the housing wall and the embedments. Such apertures may of course have various desired sizes and configurations.

It will be understood that each of the elements described above, or two or more together, may also find a useful application in other types of constructions differing from the types described above.

While the invention has been illustrated and described as embodied in a housing for a gear-driven apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A housing, particularly for a gear-driven apparatus, comprising a cast peripheral housing wall having an interior surface defining inwardly of said surface an interior chamber for the components of said apparatus and consisting of a first material permitting manufacture of said wall as a casting; and at least one embedment in said peripheral wall located in its entirety behind and outwardly of said interior surface and consisting of a second material having greater strength characteristics than said first material.

2. A housing as defined in claim 1, wherein said embedment is a sheet-metal insert.

3. A housing as defined in claim 1, wherein said embedment is a tubular member provided with opposite apertures intermediate its ends.

4. A housing as defined in claim 1, wherein said first material is cast aluminum, and wherein said second material is steel.

5. A housing as defined in claim 1, wherein said first material has a predetermined coefficient of thermal expansion, and wherein said second material has a coefficient of thermal expansion which at least approximates said predetermined coefficient.

6. A housing as defined in claim 1, said embedment being substantially completely embedded in said first material.

7. A housing as defined in claim 1, at least part of said embedment being substantially completely embedded in said first material.

8. A housing as defined in claim 1, wherein said second material has a greater tensile strength than said first material.

9. A housing, particularly for a gear-driven apparatus, comprising a cast peripheral housing wall defining an interior chamber for the components of said apparatus and consisting of a first material permitting manufacture of said wall as a casting; and at least one reinforcing embedment in said wall and consisting of a second material having greater strength characteristics than said first material, said embedment being a tubular member slit along a generatrix thereof and having spaced ends, and having a flange-shaped portion provided on at least one of said ends.

10. A housing, particularly for a gear-driven apparatus, comprising a cast peripheral housing wall defining an interior chamber for the components of said apparatus and consisting of a first material permitting manufacture of said wall as a casting; and at least one reinforcing embedment in said wall and consisting of a second material having greater strength characteristics than said first material, said wall and said embedment each having at least one registering aperture, with that in said embedment being at least equal in size and dimension to that in said wall.

11. A housing, particularly for a gear-driven apparatus, comprising a cast peripheral housing wall defining an interior chamber for the components of said apparatus and consisting of a first material permitting manufacture of said wall as a casting; and at least one reinforcing embedment in said wall and consisting of a second material having greater strength characteristics than said first material, said embedment being provided with apertures filled by the material of said wall whereby the latter and said embedment are interlocked against forces tending to cause them to perform movements relative to one another.

* * * * *